(12) United States Patent
Kim et al.

(10) Patent No.: US 9,184,851 B2
(45) Date of Patent: Nov. 10, 2015

(54) OPTICAL LINE TERMINAL AND OPTICAL NETWORK UNIT FOR SUPPORTING SLEEP MODE THEREOF

(71) Applicant: Electronics and Telecommunications Research Institute, Daejeon (KR)

(72) Inventors: Geun Yong Kim, Gwangju (KR); Sung Chang Kim, Gwangju (KR); Hark Yoo, Gwangju (KR); Youngsuk Lee, Gwangju (KR); Dongsoo Lee, Seoul (KR); Young Sun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 177 days.

(21) Appl. No.: 13/798,298

(22) Filed: Mar. 13, 2013

(65) Prior Publication Data

US 2014/0133843 A1    May 15, 2014

(30) Foreign Application Priority Data

Nov. 14, 2012    (KR) .................. 10-2012-0128989

(51) Int. Cl.
*H04B 10/564* (2013.01)
*H04B 10/08* (2006.01)
*H04B 10/272* (2013.01)

(52) U.S. Cl.
CPC ............ *H04B 10/564* (2013.01); *H04B 10/272* (2013.01)

(58) Field of Classification Search
CPC . H04B 10/564; H04B 10/272; H04J 14/0227; H04J 14/0282
USPC ...................................... 398/9, 2, 1
See application file for complete search history.

(56) References Cited

U.S. PATENT DOCUMENTS

| | | | |
|---|---|---|---|
| 7,818,648 B2 * | 10/2010 | Haran ............... | 714/752 |
| 8,014,674 B2 | 9/2011 | Gao et al. | |
| 2008/0212964 A1 * | 9/2008 | Gao et al. .......... | 398/58 |
| 2009/0263127 A1 * | 10/2009 | Haran et al. ....... | 398/38 |
| 2009/0317082 A1 * | 12/2009 | Kimura et al. ..... | 398/67 |
| 2010/0021158 A1 * | 1/2010 | Kanno et al. ...... | 398/27 |
| 2010/0074614 A1 * | 3/2010 | DeLew et al. ...... | 398/17 |
| 2011/0318008 A1 * | 12/2011 | Kubo et al. ........ | 398/66 |
| 2012/0177361 A1 * | 7/2012 | Hirano et al. ...... | 398/1 |
| 2014/0133843 A1 * | 5/2014 | Kim et al. .......... | 398/9 |

OTHER PUBLICATIONS

Lei Shi et al., "Energy-Efficient PON with Sleep-Mode ONU: Progress, Challenges, and Solutions", IEEE Network, Mar.-Apr. 2012, pp. 36-41, vol. 26, Issue 2.

* cited by examiner

*Primary Examiner* — Oommen Jacob
(74) *Attorney, Agent, or Firm* — Rabin & Berdo, P.C.

(57) ABSTRACT

An optical line terminal is provided which includes an upward band allocating unit configured to send an upward bandwidth allocation map to an optical network unit and to determine a sleep mode of the optical network unit according to whether a response message corresponding to the upward bandwidth allocation map is received; and an alarm unit configured to determine an upward bandwidth allocation map transfer operation as a normal operation according to an operation of the sleep mode.

8 Claims, 2 Drawing Sheets

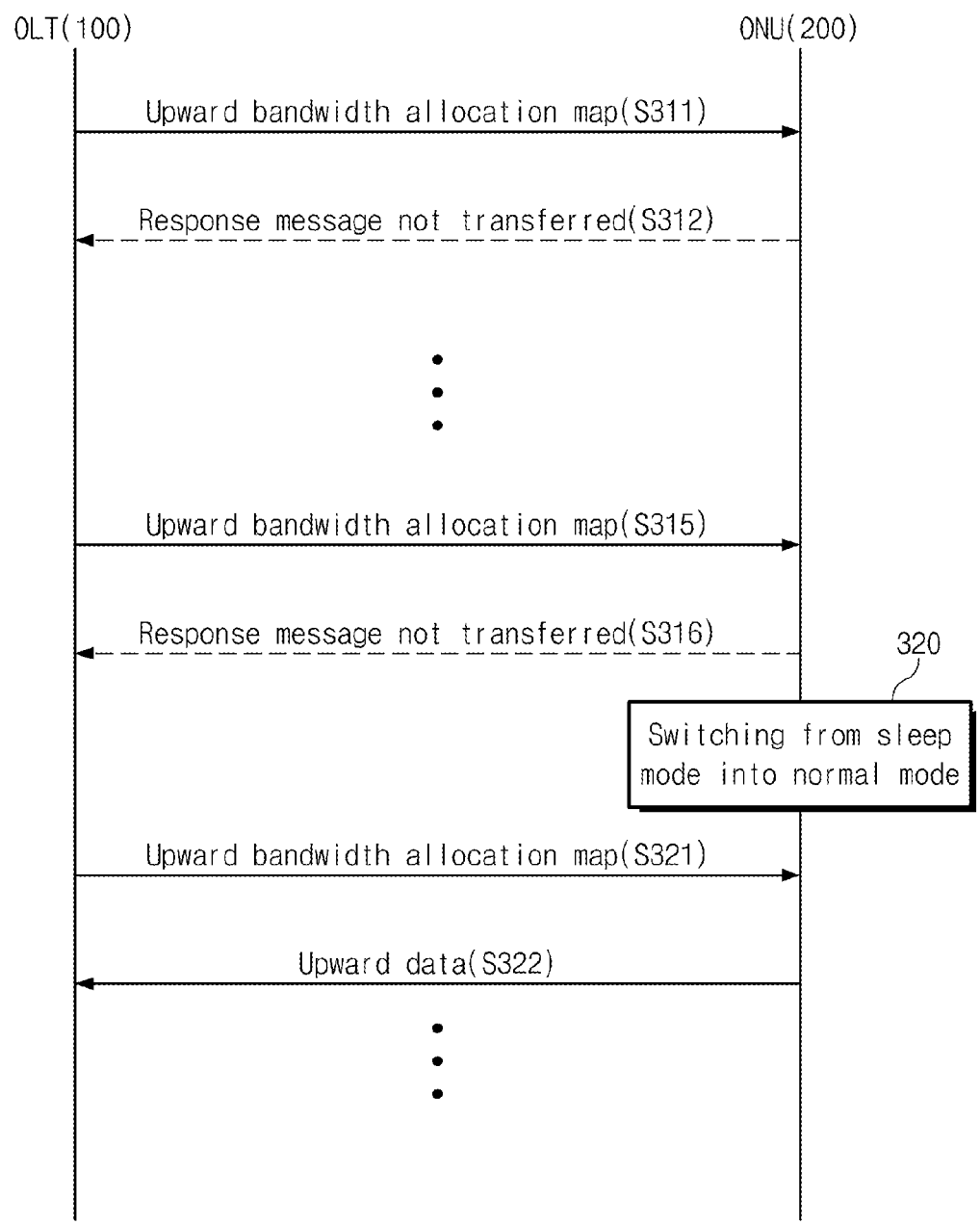

OPTICAL LINE TERMINAL AND OPTICAL NETWORK UNIT FOR SUPPORTING SLEEP MODE THEREOF

CROSS-REFERENCE TO RELATED APPLICATIONS

A claim for priority under 35 U.S.C. §119 is made to Korean Patent Application No. 10-2012-0128989 filed Nov. 14, 2012, in the Korean Intellectual Property Office, the entire contents of which are hereby incorporated by reference.

BACKGROUND

The inventive concepts described herein relate to an optical communication system, and more particularly, relate to an optical line terminal and an optical network unit capable of supporting an efficient sleep mode for power saving of the optical network unit.

In a next-generation optical communication system, there may be proposed two low-power modes according to a need for power saving. One may be a doze mode and the other may be a cyclic sleep mode. In the two low-power modes, an operation of an optical transceiver may be controlled for actual power saving. Below, the two low-power modes will be described. The doze mode may be a mode where an optical transmitter of an optical network unit is controlled to perform an on operation or an off operation periodically. The cyclic sleep mode may be a mode where an optical transmitter and an optical receiver in the optical network unit are controlled to perform an on operation or an off operation periodically.

As an example, a passive optical network (hereinafter, referred to 'PON') may be a next-generation optical communication system. The PON may mean an optical communication network for a subscriber period (i.e., an optical network) which is formed of optical passive elements not requiring a separate power supply. In the PON, an optical splitter may be placed at a specific point of an optical line network from an optical line terminal (hereinafter, referred to 'OLT') until a subscriber. A PON manner may have such a structure that a passive element not requiring a power supply is installed at an optical splitter to receive a plurality of optical network units (hereinafter, referred to 'ONUs') via one optical fiber.

In the PON, the doze mode and the cyclic sleep mode may operate as follows. The OLT may send a PLOAM (Physical Layer Operations Administrations and Maintenance) control message, indicating possibility of a transition to the sleep mode, to a specific ONU when the specific ONU transitions to a sleep mode. In response to the PLOAM control message provided from the OLT, the ONU may periodically determine whether own state is capable to being switched into the sleep mode. If a transition to the sleep mode is possible, the PLOAM control message indicating possibility of a transition to the sleep mode may be sent to the OLT.

If the ONU transmits and receives a signal indicating a transition to the sleep mode, it may transition to the sleep mode. In the sleep mode, the ONU may operate at a mode, set to an OMCI (ONT Management Control Interface) control channel, from among the doze mode and the cyclic sleep mode.

The doze mode may be a mode where an optical transmitter of an optical module is periodically turned on/off. Thus, since an optical receiver is always turned on, it may receive downward data anytime. However, transmission may be performed only when the optical transmitter is turned on.

The cyclic sleep mode may be a mode where a transmitter and a receiver of the optical module are periodically turned on/off at the same time. Although data transmission and reception are not free by transmitting and receiving data only when both the transmitter and the receiver are turned on, a power consumed at the cyclic sleep mode may be less than that at the doze mode.

If the OLT or ONU does not correspond to a sleep mode operating condition during the sleep mode of the ONT operates, a transition to a normal mode may be performed.

For example, the ONU may detect that traffic is applied to an UNI (User Network Interface) port. This case may include the case that a subscriber turns a computer (e.g., PC) on or the case that a receiver of a VoIP (Voice of Internet Protocol) telephone is on. At this time, the ONU may transmit the PLOAM control message indicating a transition to the normal mode to the OLT.

Alternatively, the OLT may detect that there gets a phone call from the exterior. This case may include the OLT detects a transition to the normal mode prior to the ONU. At this time, the ONU may transmit the PLOAM control message, indicating a transition of a normal mode, or an FWI (Forced Wake-up Indication) bit to the ONU.

A conventional optical communication system may save a power using the normal mode and the sleep mode. However, an operation for saving a power during the sleep mode may not be proposed.

SUMMARY

One aspect of embodiments of the inventive concept is directed to provide an optical line terminal which comprises an upward band allocating unit configured to send an upward bandwidth allocation map to an optical network unit and to determine a sleep mode of the optical network unit according to whether a response message corresponding to the upward bandwidth allocation map is received; and an alarm unit configured to determine an upward bandwidth allocation map transfer operation as a normal operation according to an operation of the sleep mode.

In example embodiments, the upward band allocating unit determines an operation of the optical network unit to be a sleep mode when the response message is not received.

In example embodiments, the alarm unit checks upward data from the optical network unit to generate an alarm signal according to the check result.

In example embodiments, the optical line terminal further comprises an error processing unit configured to process errors generated at operations of sleep and normal modes of the optical network unit through the alarm unit and the upward band allocating unit.

Another aspect of embodiments of the inventive concept is directed to provide an optical network unit which comprises an optical transmitter configured to transmit upward data to an optical line terminal; and an upward band allocating unit configured to receive an upward bandwidth allocation map from the optical line terminal and to block a power supplied to the optical transmitter when operating at a sleep mode.

In example embodiments, the optical network unit further comprises a subscriber port monitoring unit configured to monitor upward data to be transmitted to the optical line terminal.

In example embodiments, the upward band allocating unit switches an operation of the optical network unit into a normal mode according to an upward data monitoring result.

In example embodiments, the optical network unit further comprises a sleep mode controlling unit configured to control an operation of the sleep mode.

In example embodiments, the optical network unit further comprises a power state notifying unit configured to control the upward band allocating unit to send a power-off state bit when the optical network unit is powered off.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 2 is a diagram illustrating a sleep mode control relationship between an optical line terminal and an optical network unit in an optical communication system according to an embodiment of the inventive concept.

DETAILED DESCRIPTION

Figure 1:
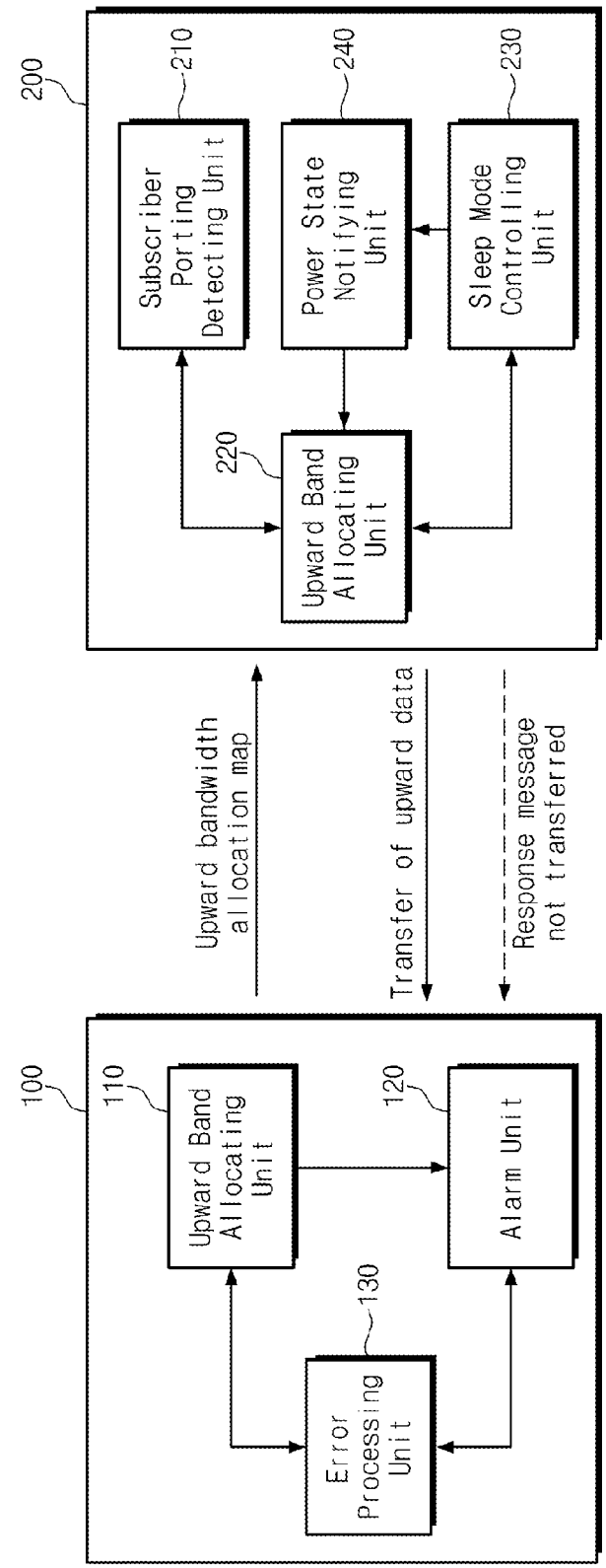
FIG. 1 is a block diagram schematically illustrating an optical communication system according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The inventive concept may provide an operation where an optical line terminal (hereafter, referred to as 'OLT') saves a power of an optical network unit (hereinafter, referred to as 'ONU') at a sleep mode of an optical communication system. As an example, an optical communication system network will be described with reference to a passive optical network (hereinafter, referred to as 'PON'). In particular, the inventive concept will be described with reference to XGPON1 (10 Gigabit-capable Passive Optical Network1) as the G.987 standard. However, the inventive concept may be applied to an OLT and an ONU in another network for power saving of a sleep mode.

FIG. 1 is a block diagram schematically illustrating an optical communication system according to an embodiment of the inventive concept.

Referring to FIG. 1, an optical communication system may include an OLT 100 providing a service and an ONU 200 receiving a service provided at the OLT 100. Herein, the ONU 200 may have a structure in which a plurality of ONUs is connected with one OLT 100.

Below, data transferred from the OLT 100 to the ONU 200 may be referred to as downward data, and data transferred from the ONU 200 to the OLT 100 may be referred to as upward data.

The OLT 100 may include an upward band allocating unit 110, an alarm unit 120, and an error processing unit 130.

The upward band allocating unit 110 may allocate an upward band for transferring upward data to the ONU 200. The upward band allocating unit 110 may periodically transfer an upward bandwidth allocation map for allocation of an upward band to the ONU 200. Also, when a response message corresponding to a transfer of the upward bandwidth allocation map, the upward band allocating unit 110 may decide an operation of the ONU 200 as a sleep mode. At this time, the upward band allocating unit 110 may provide the alarm unit 120 with information indicating that an operation of the ONU 200 is at a sleep mode state.

The alarm unit 120 may check an operating error of the ONU 200 from the upward data received from the ONU 200. If the upward data includes information on the operating error of the ONU 200, the alarm unit 120 may generate an alarm signal. The alarm unit 120 may provide the error processing unit 130 with the alarm signal. If information indicating that an operating state of the ONU 200 is a sleep state is received from the upward band allocating unit 110, the alarm unit 120 may not generate an alarm signal. Thus, separation from a LOBi alarm on the ONU 200 of the sleep mode may be made by the alarm unit 120.

The error processing unit 130 may process an error on the ONU 200 as well as errors on a plurality of other ONUs (not shown). For this, the error processing unit 13 may transmit and receive information for error processing from the upward band allocating unit 110 and the alarm unit 120. The error processing unit 130 may provide a manager or an operator with a result on an error of the ONU 200 which operates at a sleep mode and a normal mode.

The ONU 200 may include a subscriber porting detecting unit 210, an upward band allocating unit 220, a sleep mode controlling unit 230, and a power state notifying unit 240.

The subscriber port detecting unit 210 may detect a port through which traffic from a subscriber is transmitted and received. For example, the subscriber port detecting unit 210 may detect an Ethernet port. If data from a subscriber terminal (e.g., a PC, a notebook computer, a tablet PC, a VoIP, etc.) is received at the ONU which operates at a sleep mode, the subscriber port detecting unit 210 may report that upward data toward the sleep mode controlling unit 230 and the upward band allocating unit 220 exists. Thus, the subscriber port detecting unit 210 may operate at a normal mode as well as at a sleep mode.

The upward band allocating unit 220 may receive an upward bandwidth allocation map from the OLT 100 to check that an operation is performed at the sleep mode, through the sleep mode controlling unit 230. At the sleep mode, the upward band allocating unit 220 may not send a response message corresponding to the upward bandwidth allocation map.

When the ONU 200 operates at the sleep mode, the sleep mode controlling unit 230 may signal to the OLT 100. For example, the sleep mode controlling unit 230 may process a PLOAM (Physical Layer Operations Administrations and Maintenance) message received from the OLT 100 or a PLOAM to be sent to the OLT 100. Also, the sleep mode controlling unit 230 may provide information on an operating state of the ONU 200 according to a check result of an operating state of the upward band allocating unit 220.

At power-off of the ONU 200, the power state notifying unit 240 may transfer a power-off state to the OLT 100 through the upward band allocating unit 220. The ONU 200 may have a separate power (e.g., a battery) for transmitting a power-off state bit (e.g., dying gasp) at the power state notifying unit 240. If the ONU 200 is powered off, the power state notifying unit 240 may notify it to the upward band allocating unit 220 and the sleep mode control unit 230 such that a power-off state bit is normally transferred to the OLT 100.

As described above, the ONU 200 which receives an upward bandwidth allocation map transferred from the OLT 100 may not send a response message corresponding to the upward bandwidth allocation map. At this time, although the response message corresponding to the upward bandwidth allocation map is not received, the OLT 100 may not decide this state as an error. Thus, since it is unnecessary to supply a power to an optical transmitter to transmit a response message during the sleep mode, the ONU 200 may efficiently save a power at the sleep mode.

FIG. 2 is a diagram illustrating a sleep mode control relationship between an optical line terminal and an optical network unit in an optical communication system according to an embodiment of the inventive concept.

In FIG. 2, there may be illustrated a message transmission/reception procedure between an OLT 100 and an ONU 200. First of all, the ONU 200 may operate at a sleep mode.

In operation S311, the OLT 100 may send an upward bandwidth allocation map to the ONU 200.

In operation S312, the ONU 200 receiving the upward bandwidth allocation map may not send a response message corresponding to the upward bandwidth allocation map to the OLT 100. At this time, the ONU 200 may operate at the sleep mode.

In operation S315, the OLT 100 may periodically send the upward bandwidth allocation map to the ONU 200.

In operation S316, the ONU 200 receiving the upward bandwidth allocation map may not send a response message corresponding to the upward bandwidth allocation map to the OLT 100. At this time, the ONU 200 may operate at the sleep mode.

At the sleep mode, an optical transmitter of an optical transceiver of the ONU 200 may maintain an off state, so that a power is not consumed by the optical transmitter.

In operation S320, a mode of the ONU 200 may be switched into a normal mode from the sleep mode. In response to a transition to the normal mode, the ONU 200 may supply a power by turning the optical transmitter on. In the ONU 200, data traffic from a subscriber terminal may exist, or such a situation that state information of the ONU 200 has to be notified to the OLT 100 may arise. At this time, a mode of the ONU 200 may be switched into the normal mode.

In operation S321, the OLT 100 may send the upward bandwidth allocation map to the ONU 200.

The ONU 200 operating at the normal mode may send a response message to the upward bandwidth allocation map and upward data to the OLT 100. At this time, the OLT 100 may perform a normal error detecting operation according to message transmission/reception with the ONU 200.

In example embodiments, in the case that the ONU 200 of an optical communication system of the inventive concept maintains a sleep mode with respect to an upward bandwidth allocation map the OLT 100 sends, it may not send a response message. Although the OLT 100 does not receive a response message to the upward bandwidth allocation map from the ONU 200, it may regard a mode of the ONU 200 as a sleep mode. This state may not be processed as an error. Thus, it is possible to maximize a power saving effect at a sleep mode of the ONU 200.

In example embodiments, the OLT 100 and the ONU 200 of the inventive concept may be implemented by ASIC such as FPGA or SoC.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. An optical line terminal, comprising:
an upward band allocating unit configured to send an upward bandwidth allocation map to an optical network unit (ONU),
to determine that the ONU operates in a sleep mode if a response message corresponding to the upward bandwidth allocation map is not received from the ONU, and
to determine that the ONU operates in a normal mode if the response message corresponding to the upward bandwidth allocation map is received from the ONU; and an alarm unit configured
to check upward data received from the ONU for an operation error of the ONU, and, upon detecting the operation error from the received data, to generate an alarm signal, during a period in which the ONU is determined by the upward band allocating unit to operate in the normal mode, and
to refrain from generating an alarm signal by checking an operation error of the ONU during an entire period in which the ONU is determined by the upward band allocating unit to operate in the sleep mode.

2. The optical line terminal of claim 1, further comprising:
an error processing unit configured to process the operation error found by the alarm unit or an error found by the upward band allocating unit.

3. An optical network unit (ONU), comprising:
an optical transmitter configured to transmit upward data to an optical line terminal (OLT); and
an upward band allocating unit configured
to receive an upward bandwidth allocation map from the OLT, and to check whether the ONU operates in a sleep mode or a normal mode,
upon determining that the ONU operates in the normal mode, to transmit a response message corresponding to the upward bandwidth allocation map to the OLT, and
upon determining that the ONU operates in the sleep mode,
to refrain from sending the response message corresponding to the upward bandwidth allocation map to the OLT, and
to block power supply to the optical transmitter during an entire period in which the ONU operates in the sleep mode.

4. The optical network unit of claim 3, further comprising:
a subscriber port monitoring unit configured to monitor the upward data to be transmitted to the optical line terminal.

5. The optical network unit of claim 4, wherein the upward band allocating unit switches an operation of the optical network unit from the sleep mode to the normal mode according to an upward data monitoring result.

6. The optical network unit of claim 3, further comprising:
a sleep mode controlling unit configured to control an operation of the sleep mode.

7. The optical network unit of claim 6, further comprising:
a power state notifying unit configured to control the upward band allocating unit to send a power-off state bit when the optical network unit is powered off.

8. The optical line terminal of claim 1, wherein the upward band allocating unit is configured to periodically send the upward bandwidth allocation map to the ONU when the ONU operates in the sleep mode.

* * * * *